(12) United States Patent
Gilboa

(10) Patent No.: US 7,975,254 B2
(45) Date of Patent: Jul. 5, 2011

(54) DESIGN-TIME RULES MECHANISM FOR MODELING SYSTEMS

(75) Inventor: Yuval Gilboa, Pardesiya (IL)

(73) Assignee: SAP Portals Israel Ltd., Ra'Anana (IL)

( * ) Notice: Subject to any disclaimer, the term of this patent is extended or adjusted under 35 U.S.C. 154(b) by 1042 days.

(21) Appl. No.: 11/823,173

(22) Filed: Jun. 27, 2007

(65) Prior Publication Data

US 2009/0007062 A1      Jan. 1, 2009

(51) Int. Cl.
*G06F 9/44*      (2006.01)
(52) U.S. Cl. ......... 717/117; 717/102; 717/109; 717/113
(58) Field of Classification Search ........... 717/100–119
See application file for complete search history.

(56) References Cited

U.S. PATENT DOCUMENTS

| | | |
|---|---|---|
| 2003/0004746 A1 | 1/2003 | Kheirolomoom et al. |
| 2003/0069871 A1 | 4/2003 | Yucel |
| 2004/0054985 A1* | 3/2004 | Sewell .......................... 717/109 |
| 2005/0005262 A1* | 1/2005 | Mohan et al. .................. 717/109 |
| 2005/0028133 A1 | 2/2005 | Ananth et al. |

FOREIGN PATENT DOCUMENTS

WO      03/073343 A1      9/2003

OTHER PUBLICATIONS

Hewitt, "LogicBase and Microsoft Technologies Working Together", May 2007, Transparent Logic Inc., 24 pages.*
"European Search Report of the European Patent Office", mailed Nov. 13, 2008, for EP 08011354.1-1238, 2pgs.

* cited by examiner

*Primary Examiner* — Ted T Vo
(74) *Attorney, Agent, or Firm* — Buckley, Maschoff & Talwalkar LLC

(57) ABSTRACT

According to some embodiments, a visual design tool associated with a generic modeling framework may be selected, and a set of design-time functions used in the visual design tool may be identified. A set of design-time rules may be created (e.g., by a rule creator), each rule corresponding to an identified design-time function. In addition, parameters may be defined for each rule in terms of entities of a language of the generic modeling framework. A set of basic rule cases may then be defined for each rule to specify rule logic, and an extension mechanism may be provided to enable the defined set of basic rule cases to be extended outside the generic modeling framework. According to some embodiments, the set of rules and associated basic rule cases may be interpreted at run-time by the modeling framework.

17 Claims, 13 Drawing Sheets

FIG. 11

DESIGN-TIME RULES MECHANISM FOR MODELING SYSTEMS

FIELD

Some embodiments of the present invention may relate to business information enterprise systems or applications. In particular, some embodiments may comprise systems and methods wherein a design-time rules mechanism is provided for a modeling system associated with a visual design tool used to create content for an enterprise application, such as an enterprise portal.

BACKGROUND

A business information enterprise system may improve an organization's ability to monitor and/or manage data in a complex business environment. For example, such a system might store a large amount of business information, such as a yearly global sales plan and profit data on both a company-wide and regional basis. Different users may then access the information in different ways. For example, a business analyst might be interested in a normalized comparison of each year's sales plan figures as compared to other years. A human resources administrator might instead want to access a list of employee names located in a particular country. In general, many different types of data could be stored by, and accessed from, a business information enterprise system (e.g., inventory data, sales data, and/or accounting data) and different types of data can often be used in different ways.

In some cases, business information is accessed through a business enterprise application such as a Web-based "portal" that can display information to, and interact with, users. For example, a user might view business reports and/or select a particular item within a report to obtain further information about that item. Note that a user (or group of users) might want to customize the way in which information is displayed and/or interacted with via the portal.

To help a designer create design a portal that suits a particular domain (e.g., a particular business area or application), a visual design tool may have a pre-defined set of portal elements, such as portal templates and objects. The designer can then arrange and further define the portal elements as required. Note that some or all of these portal elements may be associated with business logic. For example, a particular type of portal element might be permitted in certain display areas (e.g., a human resources area within a portal page) while another type of portal element is not permitted in those areas.

Typically, a visual design tool is customized to help designer create portal models for a particular domain. For example, a first visual design tool might be customized specifically to be used by designers associated a first business while another visual design tool is customized to be used by designers associated with a second business. Such an approach, however, can be time consuming costly in terms of the development of customized visual design tools for different domains. Moreover, the approach may not be scalable (e.g., because a simple change to one model element can result in a complex change to a large number of previously customized visual design tools).

To avoid such problems, Object Constraint Language (OCL) definitions might be used to describe some of the elements used by a visual design tool. OCL definitions use a declarative text-based language to describe behaviors that apply to universal modeling language models, such as constraint and object query expressions that are not otherwise expressed by diagram notation. While OCL definitions can be helpful for certain batch activities, such as model validation or transformation, it requires a complex constraint solving system for the evaluation and satisfaction of expressed definitions. As a result, it may be inappropriate for interactive activities (such as model editing) that involve real-time responsiveness. When a designer is dragging and dropping a model element, for example, OCL definitions might need to be evaluated hundreds of times per second (e.g., to determine whether or not the model element is currently over an appropriate location on the display). Moreover, it may not be practical to describe context-based behavior using OCL definitions.

Approaches that may improve a designer's ability to create business information portals could, therefore, be desirable. Moreover, it may advantageous to provide one or more tools that facilitate a designer's ability to do so in an efficient, timely, and convenient manner.

BRIEF DESCRIPTION OF THE DRAWINGS

FIG. 11 illustrates a design-time rule definition display according to some embodiments.

DETAILED DESCRIPTION

Figure 1:
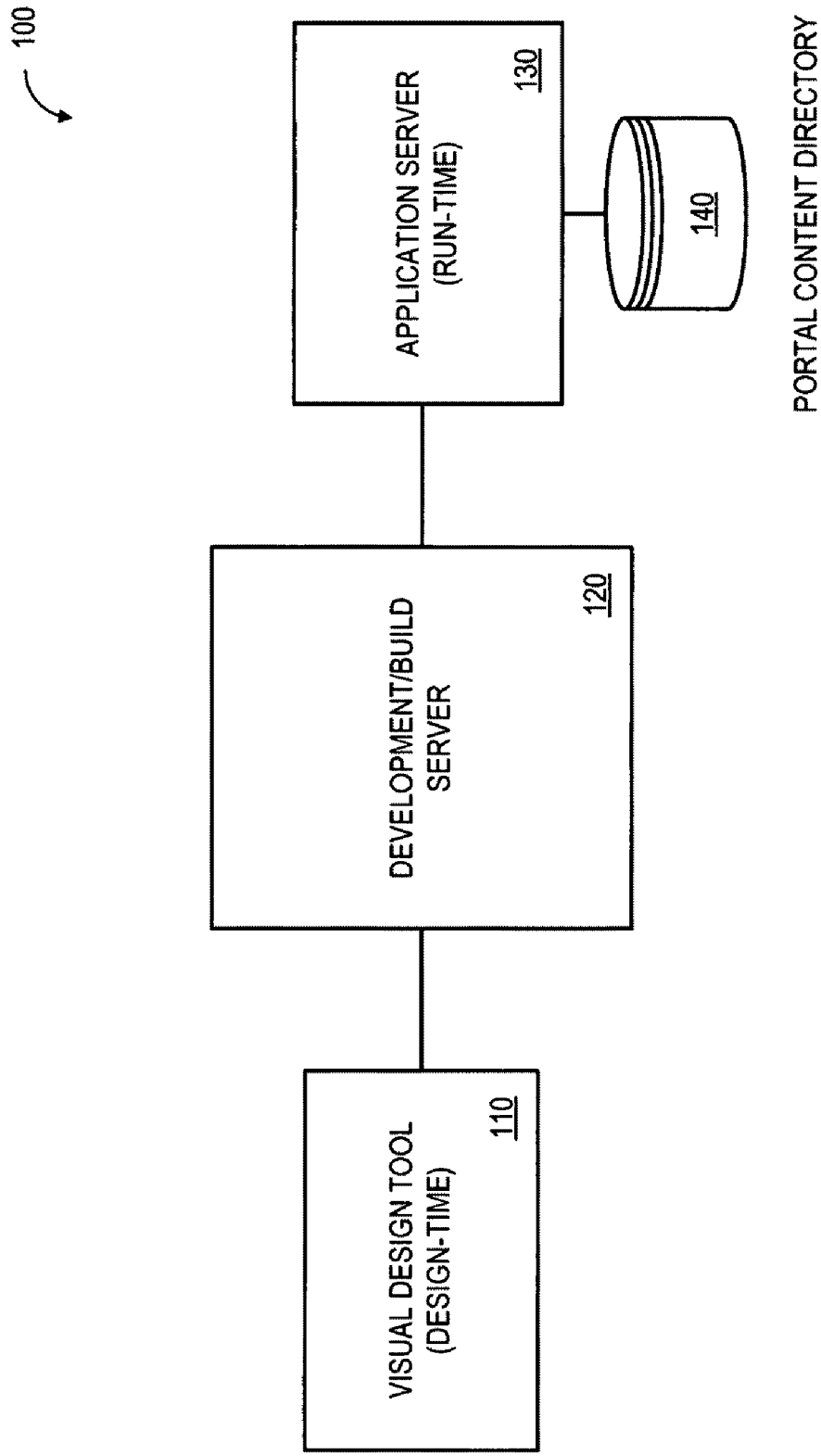
FIG. 1 is a block diagram of a system that may facilitate creation and/or presentation of a business enterprise portal according to some embodiments.

To alleviate problems inherent in the prior art, some embodiments of the present invention introduce systems, methods, computer program code, and means wherein a design-time rules mechanism is provided for a modeling system associated with a visual design tool (e.g., a tool that is used to create content for an enterprise application such as a portal). For example, FIG. 1 is a block diagram of a system 100 that may facilitate creation and delivery of a business enterprise portal according to some embodiments. Although some embodiments are described herein with respect to a business enterprise portal, note that embodiments may be associated with any other type of business application.

The system 100 includes a development/build server 120. According to some embodiments, the server 120 may receive information from an off-line repository, such as meta-model information associated with a portal content model. The meta-model information may have been created, for example, by a developer using a modeling tool. As used herein, the term "meta-model" may refer to, for example, information associated with an analysis, construction, and/or development of rules, constraints, and/or models applicable for a particular type of model. Moreover, the "model" may be associated with business applications other than a portal application. That is, according to some embodiments, it may comprise an application model instead of a portal model.

According to some embodiments, the meta-model information includes rules and other information associated with portal templates and objects. The rules might include, for example, business logic (e.g., Java instructions on how certain business parameters should be calculated) and/or a set of user interface design rules (e.g., indicating how the tool should behave when a user drags or drops items within a portal layout).

According to some embodiments, meta-model information associated with enterprise portal content is defined by a user or developer with a Graphical User Interface (GUI) modeling tool. The portal content meta-model might be, for example, a set of Unified Modeling Language (UML) class diagram definitions holding the relations, attributes, and/or constraints of portal semantic objects which are independent of run-time or design-time environments.

According to some embodiments, a visual design tool 110 executing in a design-time environment provides information to the development/build server 120. The visual design tool 110 might be associated with, for example, the SAP™ Visual Composer and/or the Eclipse design tool. The visual design tool 110 might, for example, include an XGL compiler that provides XGL information to the development/build server 120.

The development/build server 120 and visual design tool 110 may exchange information via an interface (e.g., a local interface connection or a communication network interface). Note that elements described herein as communicating with one another may be directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP), and/or Wireless Application Protocol (WAP). Although a single off-line repository 120 is illustrated in FIG. 1, note that any number of off-line repositories 120, as well as the other elements described herein, may be provided.

The development/builder server 120 may include a portal generation engine that deploys portal information to a run-time application server 130. The application server 130 might comprise, for example, a Java Enterprise Edition portal. Note, however, that any embodiments described herein may be associated with other types of servers (e.g., non-Java platforms such as by using a .Net platform). Moreover, information associated with portal content may be stored in a portal content directory 140.

According to some embodiments, the visual design tool 110 can also exchange information with the portal content directory 140. The visual design tool 110 might, for example, let a user or group of users define a particular portal layout for business information content. According to some embodiments, meta-model information associated with a portal is stored in the portal content directory 140. Note that because the portal content directory 140 may store meta-model information, the visual design tool 110 might not need to incorporate certain business logic information associated with the enterprise portal. That is, the business logic information may be "de-coupled" from a user interface of the visual design tool 110. Moreover, the portal content directory 140 may act as a central, version-controlled repository for meta-model information (such as the views, pages, systems, and/or transport packages associated with a model or meta-model).

The application server 130 might, for example, receive an HTTP portal request at run-time (e.g., including a Uniform Resource Locator (URL) address) from a user's Web browser and access information from the portal content directory 140 to create a portal view that will be provided to the user. According to some embodiments, the application server 130 is associated with a portal run-time engine that is able to execute portal components and respond with Hypertext Markup Language (HTML) information produced by the components.

Note that some or all of the devices illustrated in FIG. 1 (as well as the other systems described herein) may use processor-executable program code read from one or more of a computer-readable medium, such as a floppy disk, a CD-ROM, a DVD-ROM, a magnetic tape, and a signal encoding the process, and then stored in a compressed, uncompiled and/or encrypted format. Note that embodiments are not limited to any specific combination of hardware and software. Moreover, the devices described herein might, for example, support any of the protocols in the following non-exhaustive list: Java Database Connectivity (JDBC), Java Connector (JCO), P4, and Simple Object Access Protocol (SOAP). Moreover, the databases might comprise a relational database accessible via a Structured Query Language (SQL) interface and/or systems which provide intermediary "business intelligence" to data stored within the database.

The user interfaces, such as the visual design tool 110 of FIG. 1, might execute at a workstation, Personal Computer, or a mobile wireless device, such as a laptop computer, a Personal Digital Assistant (PDA), a tablet computer, a handheld computer, or any other suitable devices that are or become known.

Figure 2:
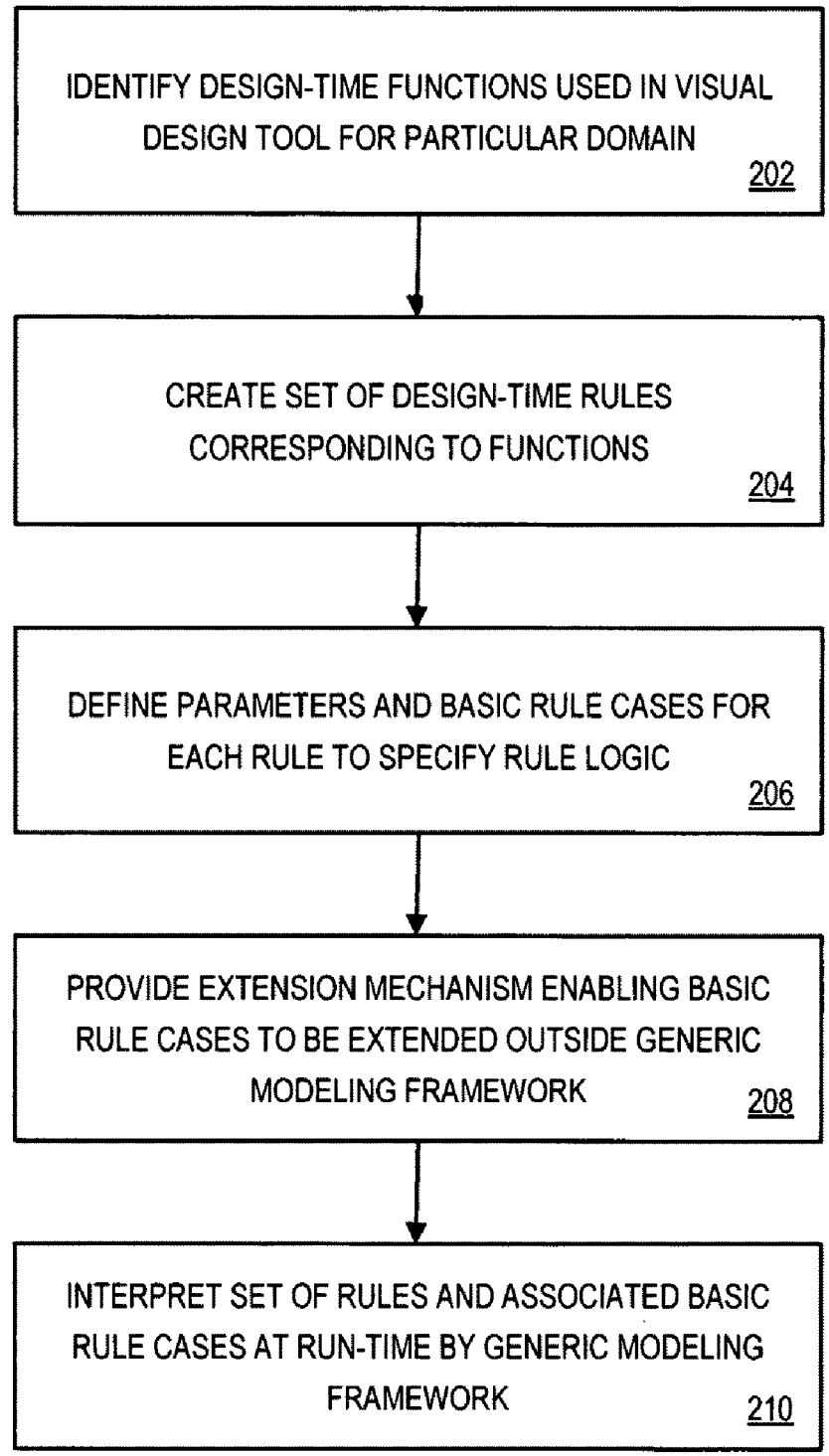
FIG. 2 is a flow diagram of portal creation process steps pursuant to some embodiments.

FIG. 2 is a flow diagram of process steps that might be associated with the system 100 of FIG. 1 pursuant to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

In particular, the process steps of FIG. 2 might define information that can later be used by the visual design tool 110 when a designer is defining a business enterprise portal (e.g., at design-time). Note that that prior to performing the steps of FIG. 2, an appropriate visual design tool 110 may be selected (e.g., a system architect might select Visual Composer or Eclipse as the appropriate visual design tool 110 to be used to define the portal information).

At 202, a set of design-time functions used in the visual design tool may be identified. For example, the visual design tool may be associated with a generic modeling framework, and the set of functions identified at 202 might include design-time operations and/or design-time queries associated with the generic modeling framework. Other examples of design-time rules might be associated with, for example, a usability rule associated with a model element context (e.g., as described with respect to FIG. 8), a visual appearance of a modeling element (including a modeling element shape or other visual attribute), a modeling element layout, a modeling element mapping to a modeling concept, a palette (e.g., as described with respect to FIG. 7), a modeling element behavior, and/or modeling element connections (e.g., as described with respect to FIG. 10). By way of example only, a rule might indicate that a particular type of portal element is not allowed to be added to a particular type of portal area or location.

At 204, a set of design-time rules may be created, with each rule corresponding to an identified design-time function. For example, a system architect might create a set of design-time rules using a declarative language. At 206, parameters for each rule can be defined in terms of entities of a language of the generic modeling framework. Moreover, a set of basic rule cases may be defined for each rule at 206 to specify rule logic. The rule logic might be associated with, for example, input parameters and/or constraints associated with a modeling element. According to some embodiments, a design-time rule may be defined and/or edited using a wizard developed for that purpose.

At 208, an extension mechanism may be provided to enable the defined set of basic rule cases to be extended outside the generic modeling framework. For example, a plug-in to the visual design tool, or a kit adapted to interact with for the visual design tool, may let the visual design tool use the information created in steps 204 and 206. As a result, appropriate restrictions, extensions, and/or adaptations of the rule's logic can be implemented via the visual design tool to meet demands associated with a particular portal designer domain (e.g., a particular business group or application).

At 210, the set of rules and associated basic rule cases are interpreted at design-time by the modeling framework. In this way, a designer using the visual design tool can experience an interface adapted for his or her specific domain—without requiring custom development of the design tool or degrading its performance. Note that the generic modeling framework may interpret the set of design-time rules (and associated basic rule cases) in substantially real-time.

After the designer creates enterprise portal content in accordance with the design-time rules, the portal may be deployed via a development server. If the resulting portal is not what the designer expected, the portal content may be modified and re-deployed (replacing the previous version), again using the design-time rules.

According to some embodiments, a visual representation of portal content associated with the visual design tool has a pre-determined relationship with a visual representation of portal content associated with the business enterprise portal that is actually delivered. That is, the visual design tool may provide a "what-you-se-is-what-you-get" rendering of the portal as it is being developed by the designer. Moreover, attributes associated with model elements as they are displayed to the designer may be defined, at least in part, using design-time rules.

Figure 3:
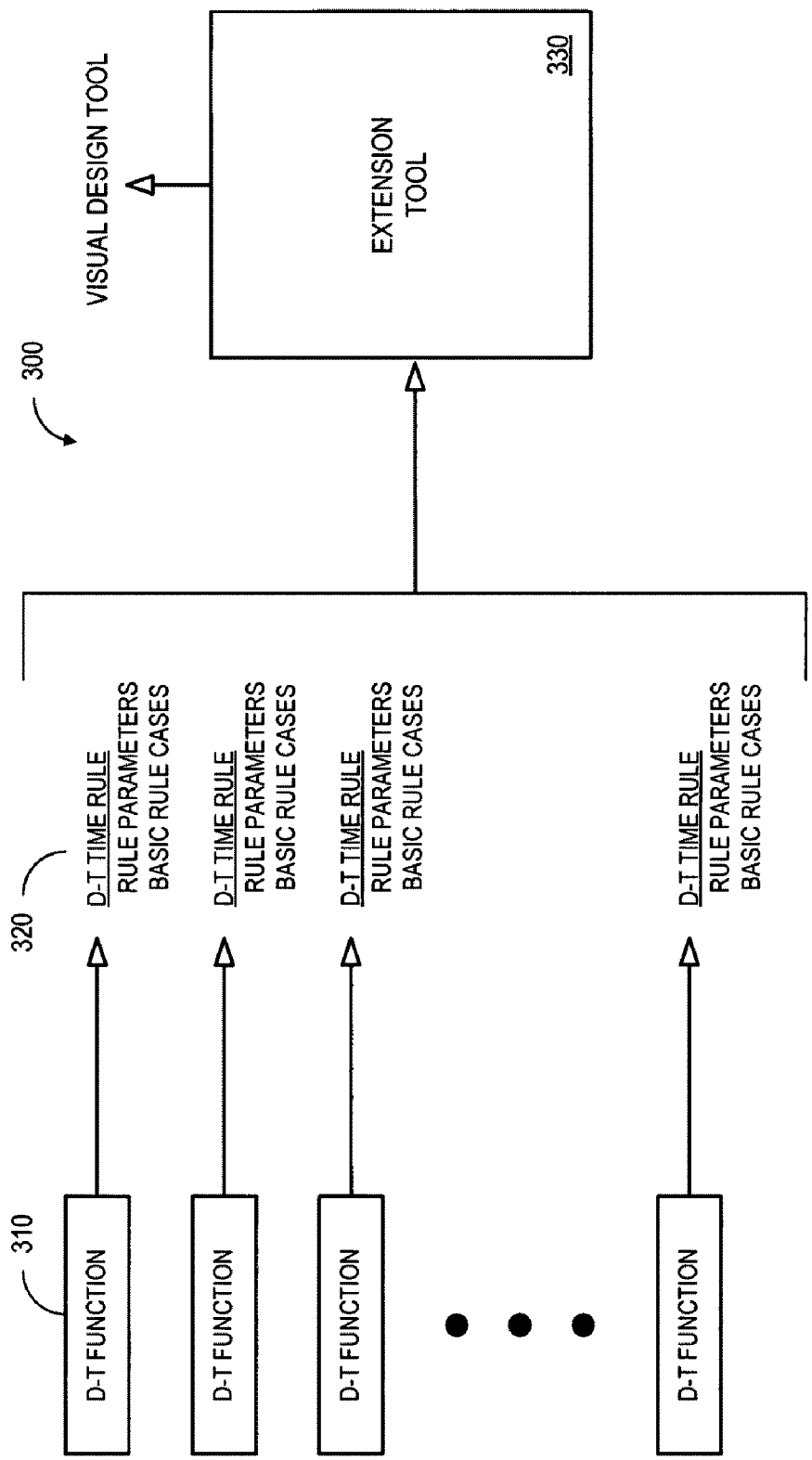
FIG. 3 illustrates a mapping of design-time functions to design-time rules associated with creation of an enterprise portal according to some embodiments.

FIG. 3 illustrates a mapping 300 of design-time functions 310 to design-time rules 320 associated with creation of a business enterprise portal according to some embodiments. The set of design-time functions 310 may be identified with, for example, a particular domain or type of business associated with the portals that will be later designed using a visual design tool. For example, the visual design tool may be associated with a generic modeling framework, and the set of design-time functions 310 might be associated with operations, queries, and/or the visual appearance and interactive characteristics of various modeling elements that need to be used in that domain.

For each design-time function 310, a design-time rule 320 may be created. For example, a system architect might create a design-time rule 320 for each function 310 using a declarative language (e.g., to provide parameters and/or basic rule cases in terms of the generic modeling framework). As a result, rule logic associated with a particular portal domain may be provided.

An extension tool 330 may receive the design-time rule 320 information and use that information to control the behavior of the visual design tool. For example, the extension tool 330 might be associated with a plug-in or kit for the visual design tool that provides the appropriate restrictions, extensions, and/or adaptations of the logic of the design-time rules 320 suitable for a particular domain (e.g., a type of business application). The extension tool 330 can then facilitate interpretation of the rules 320 at design-time (e.g., when a designer is creating an information portal for a particular domain).

Figure 4:
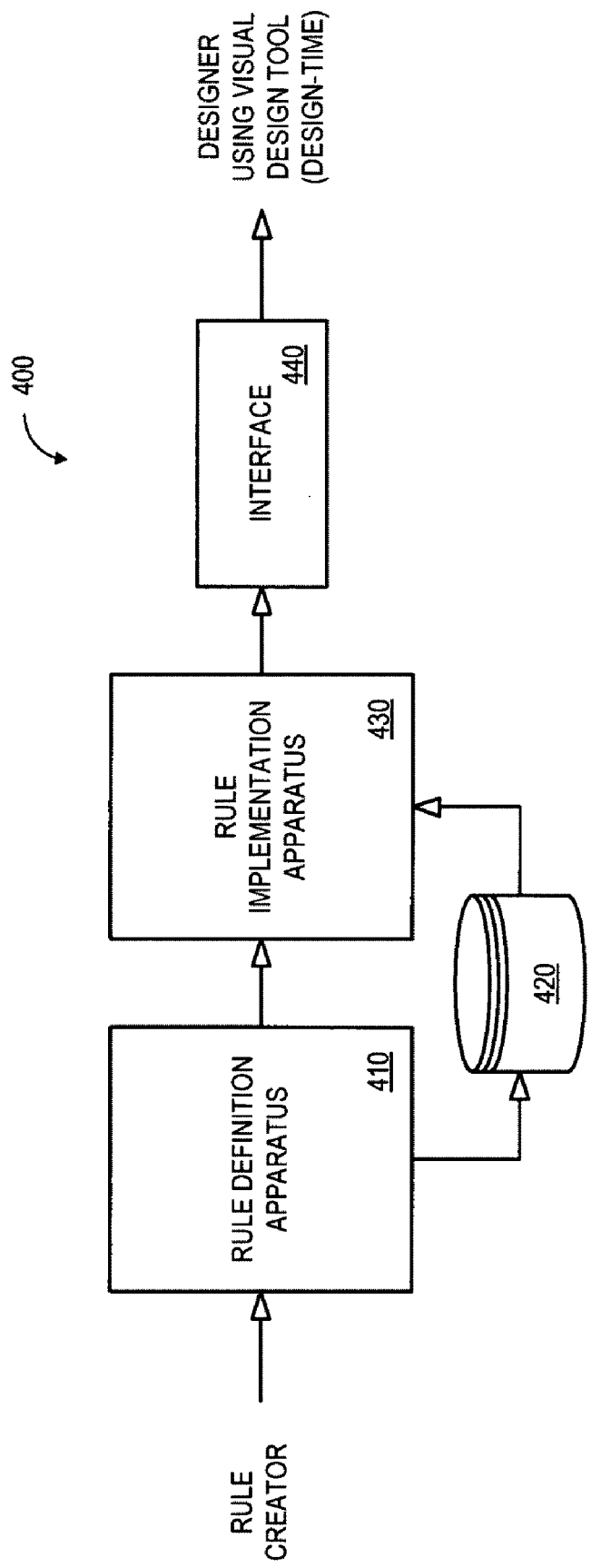
FIG. 4 illustrates a system according to some embodiments.

FIG. 4 illustrates a system 400 according to some embodiments. The system 400 may include, for example, a rule definition apparatus 410 that receives an indication of a set of design-time rules from a rule creator. Each rule might correspond, for example, to an identified design-time function (associated with one or more design domains) for a visual design tool. The rule definition apparatus 410 may also receive from the rule creator defining parameters for each rule in terms of entities of a language of a generic modeling framework associated with the visual design tool. Similarly, the rule definition apparatus 410 may receive a set of basic rule cases from the rule creator to specify rule logic. The rule definition apparatus 410 might store data associated with the received information, for example, in a design-time rule database 420.

A rule implementation apparatus 430 may receive data from the rule definition apparatus 410 and/or the design-time rule database 420. Note that the rule definition apparatus 410, rule implementation apparatus 430, and design-time rule database 420 might all be incorporated in a single device or application.

The rule implementation apparatus 430 might, according to some embodiments, use the received data to provide an extension mechanism that enables the defined set of basic rule cases to be extended outside the generic modeling framework. Moreover, the rule implementation apparatus 430 may arrange for the set of rules and associated basic rule cases to be interpreted at run-time by a generic modeling framework of the visual design tool. For example, the rule implementation apparatus 430 might provide information to an interface 440 (e.g., a plug-in or kit) that interacts with a visual design tool at design-time.

Figure 5:
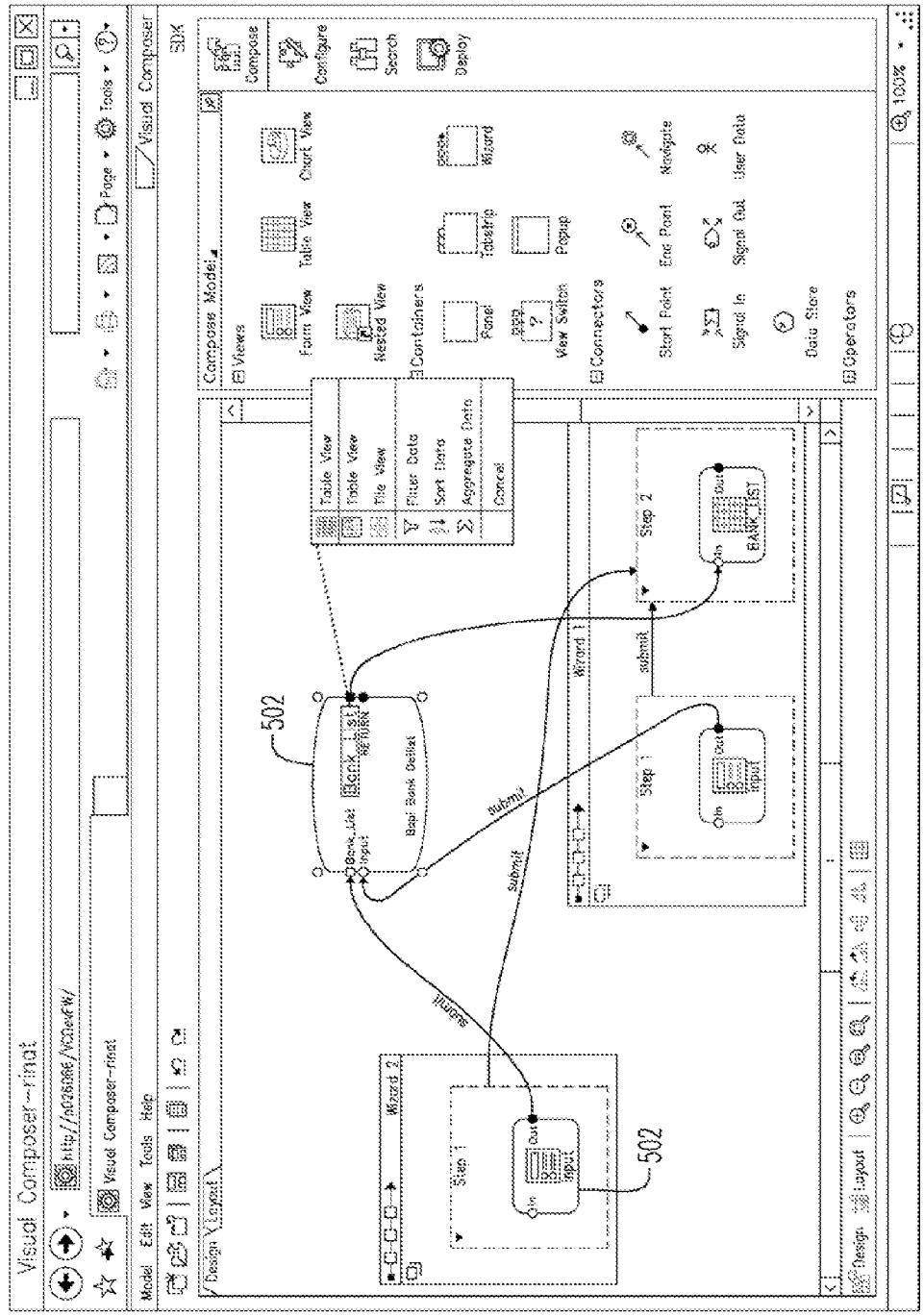
FIG. 5 illustrates a visual design tool display according to some embodiments.

As a result, a portal designer can use the visual design tool in ways that are appropriate with respect to his or her domain. For example, FIG. 5 illustrates a visual design tool Graphical User Interface (GUI) display 500 according to some embodiments. The display 500 might be associated with any modeling tool, such as the SAP Visual Composer, that implements a design-time rules mechanism. A portal designer associated with a particular domain can use the display 500, for example, to define how a business enterprise portal should look and act (e.g., by positioning and/or connecting various model elements 502 on the display 500). Some examples of how design-time rules are applied in connection with such a display 500 will now be described with respect to FIGS. 5 through 10. Moreover, one way in which design-time rules might be defined will be provided with respect to FIG. 11.

Figure 6:
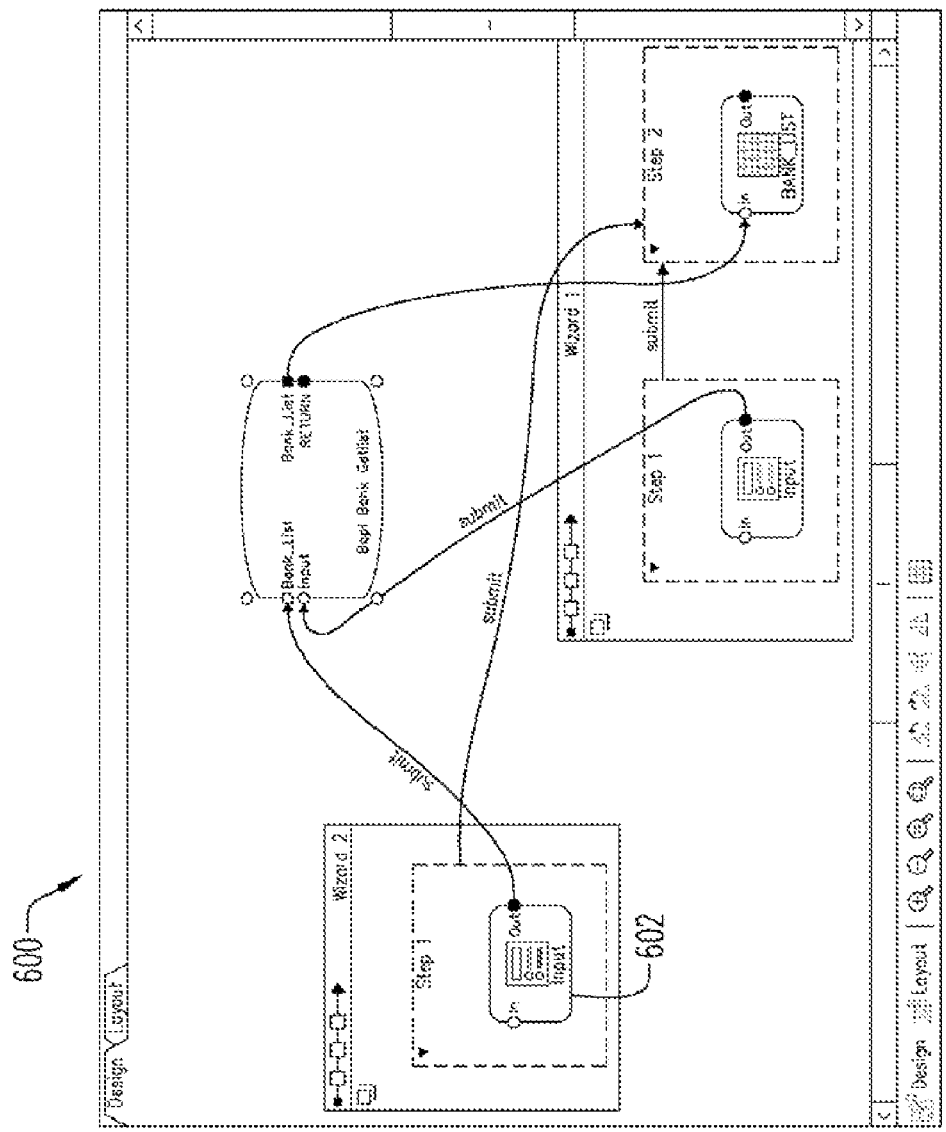
FIG. 6 illustrates the use of design-time rules to define visual appearance attributes of modeling elements according to some embodiments.

FIG. 6 is a display 600 illustrating the use of design-time rules to define visual appearance attributes of modeling elements according to some embodiments. Consider, for example, the modeling element 602 labeled "BANK_LIST." In this case, the shape, size, line width, and/or color of the modeling element 602 might be controlled be previously defined design-time rules (e.g., which were deemed to be appropriate for the particular domain associated with the display 600). Note that in addition to defining the visual appearance of the modeling elements (e.g., including their exact visual attributes and layout), the mapping of modeling elements to corresponding modeling concepts might be defined by shape definition design-time rules.

Figure 7:
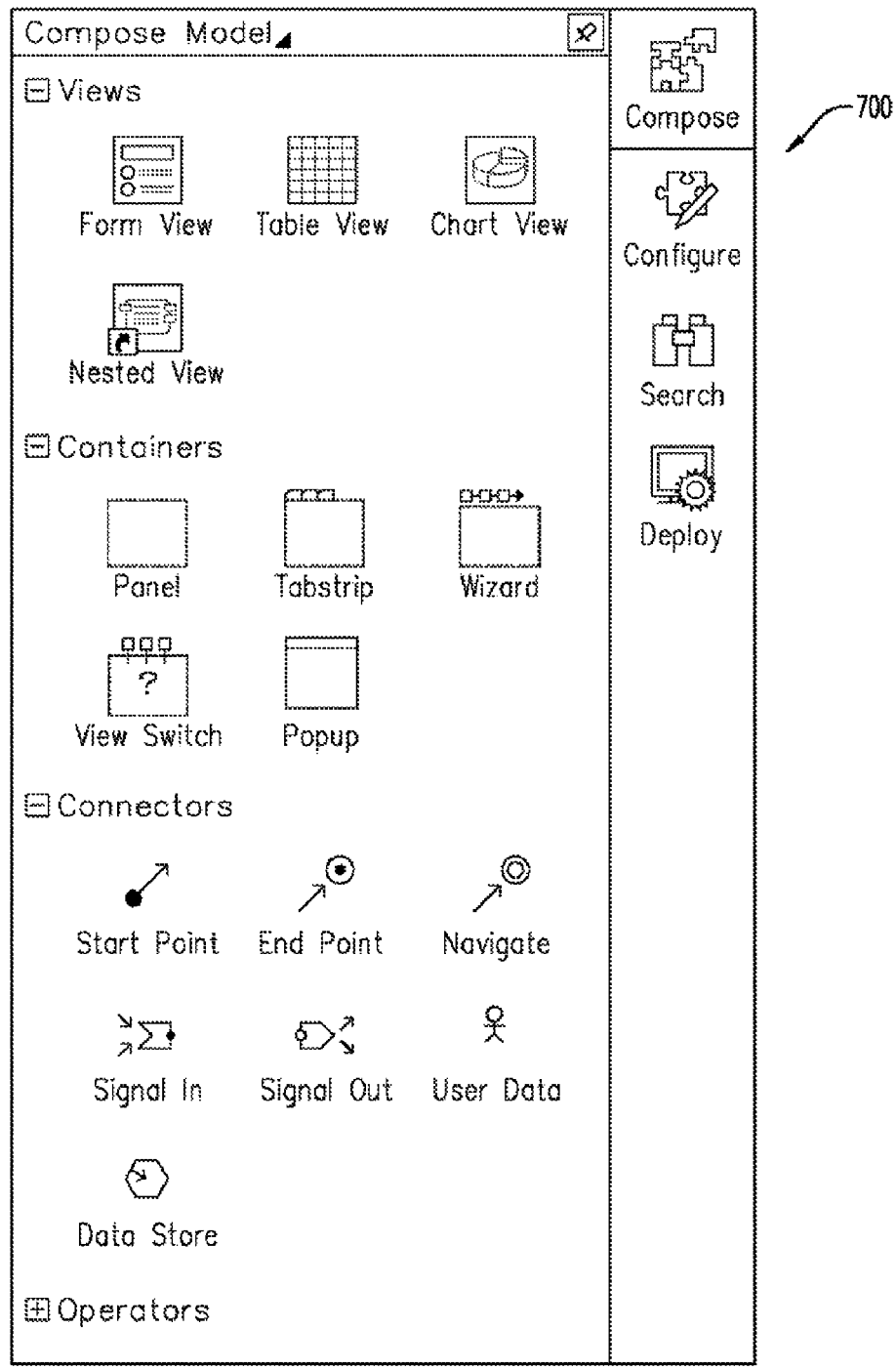
FIG. 7 illustrates a visual design tool palette according to some embodiments.

FIG. 7 is a display 700 illustrating a visual design tool palette according to some embodiments. The palette might comprise, for example, a set of modeling elements that are typically used for portals designed in connection with a particular business domain (e.g., including elements such as views, containers, connectors, and or operators associated with the modeling framework). A designer might use such a display 700 to drag an element from the palette and insert the element into his or her design (and thus, into the eventually displayed portal). For example, a design-time rule might define which modeling elements should be included on the palette along with the order and/or grouping of those elements. According to some embodiments, a design-time rule indicates that different sets of modeling elements should be included in the palette display 700 under different conditions. For example, one or more design-time rules (and the resulting palette display 700) might take into account the type of diagram currently being displayed to the designer and/or other context information to determine which elements should be included on the palette. According to some embodiments, the context information is associated with how "usable" or "useful" a particular modeling element is likely to be to a designer in a particular situation.

Figure 8:
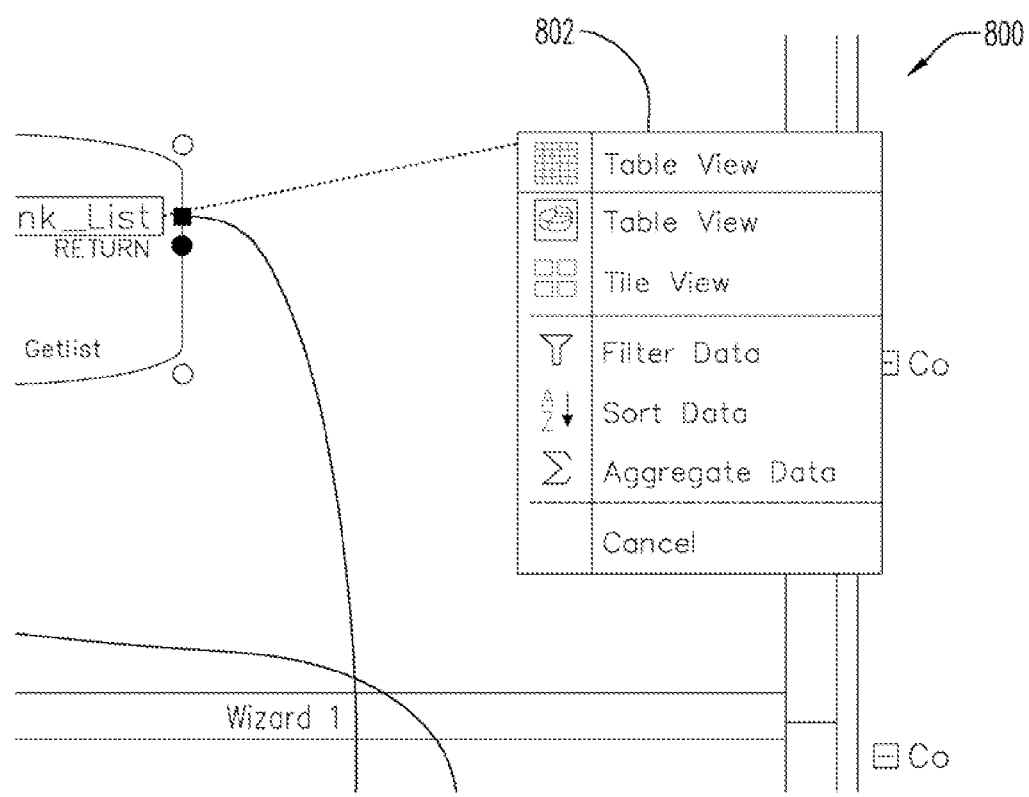
FIG. 8 illustrates the use of a context-dependent design-time rule according to some embodiments.

FIG. 8 is a display 800 illustrating another use of a context-dependent design-time rule according to some embodiments. In this case, a design-time rule defines a context menu 802. The context menu 802 might comprise, for example, a dynamic list of available modeling commands (e.g., "Table View," "Chart View," "Filter Data," "Sort Data," "Aggregate Data," and "Cancel") that changes depending on the context in which it is being displayed. In this example, the display 800 shows a context menu 802 that might be opened when a designer draws a line from a source element. The menu 802 shows a list of commonly used model elements that can be connected to the specific element from which the line is being drawn. The exact items that appear in the menu 802 (and their order) might depend on the source element and/or other context information. Moreover, according to this embodiment, the behavior of the menu 802 is defined by corresponding context menu definition design-time rules.

Figure 9A:
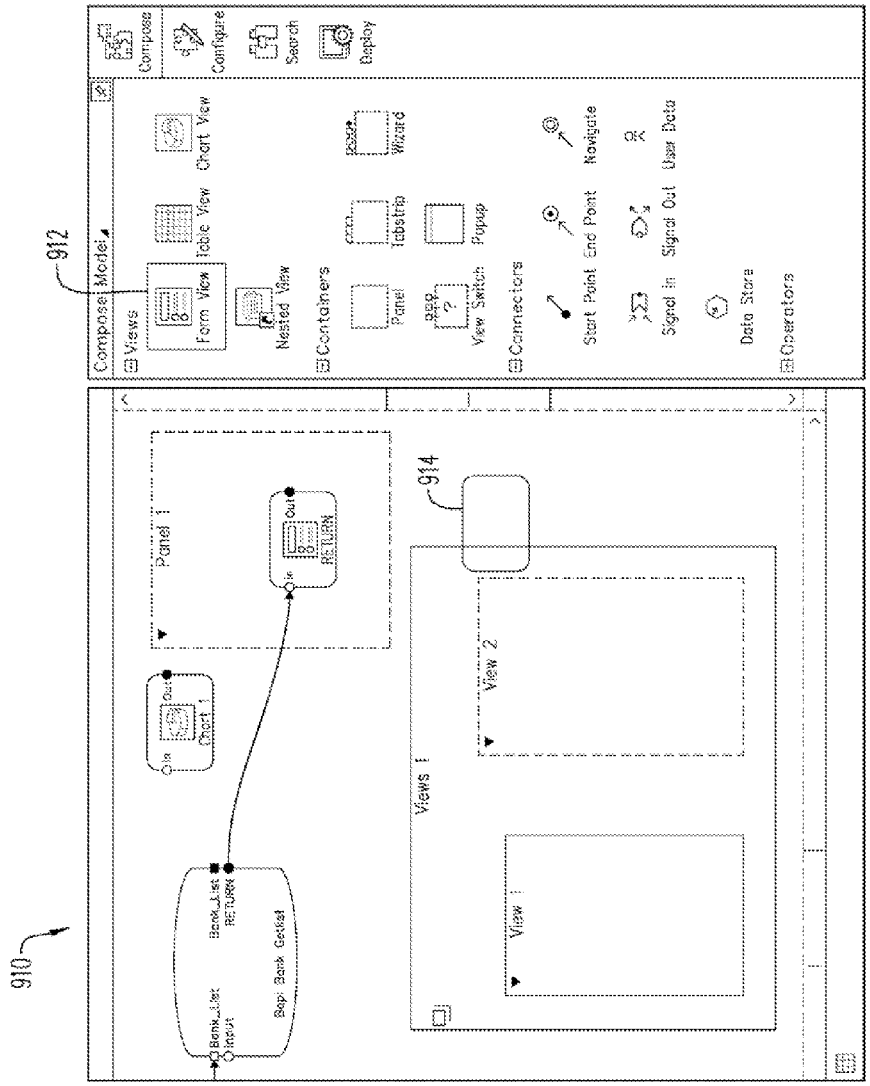
FIGS. 9A through 9C illustrate the use of a design-time rule according to some embodiments.
Figure 9B:
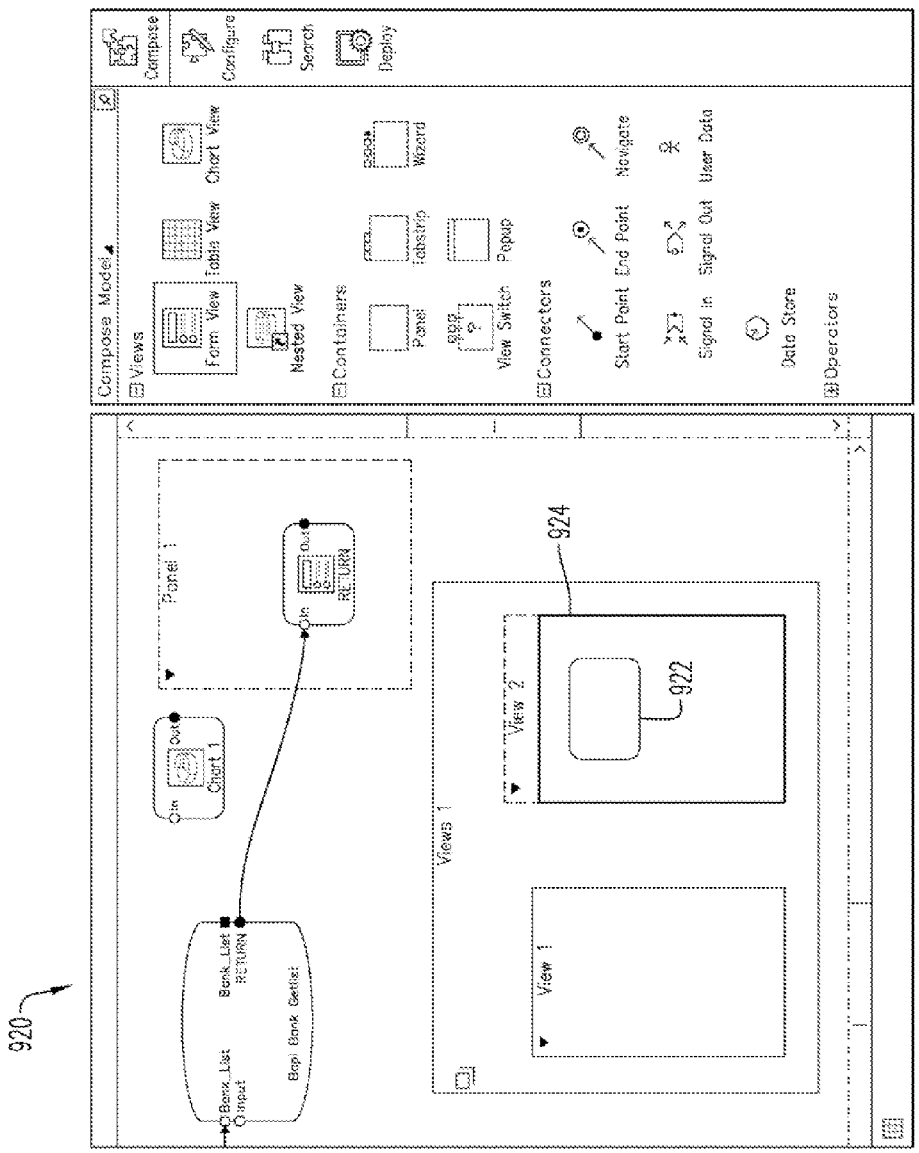
Figure 9C:
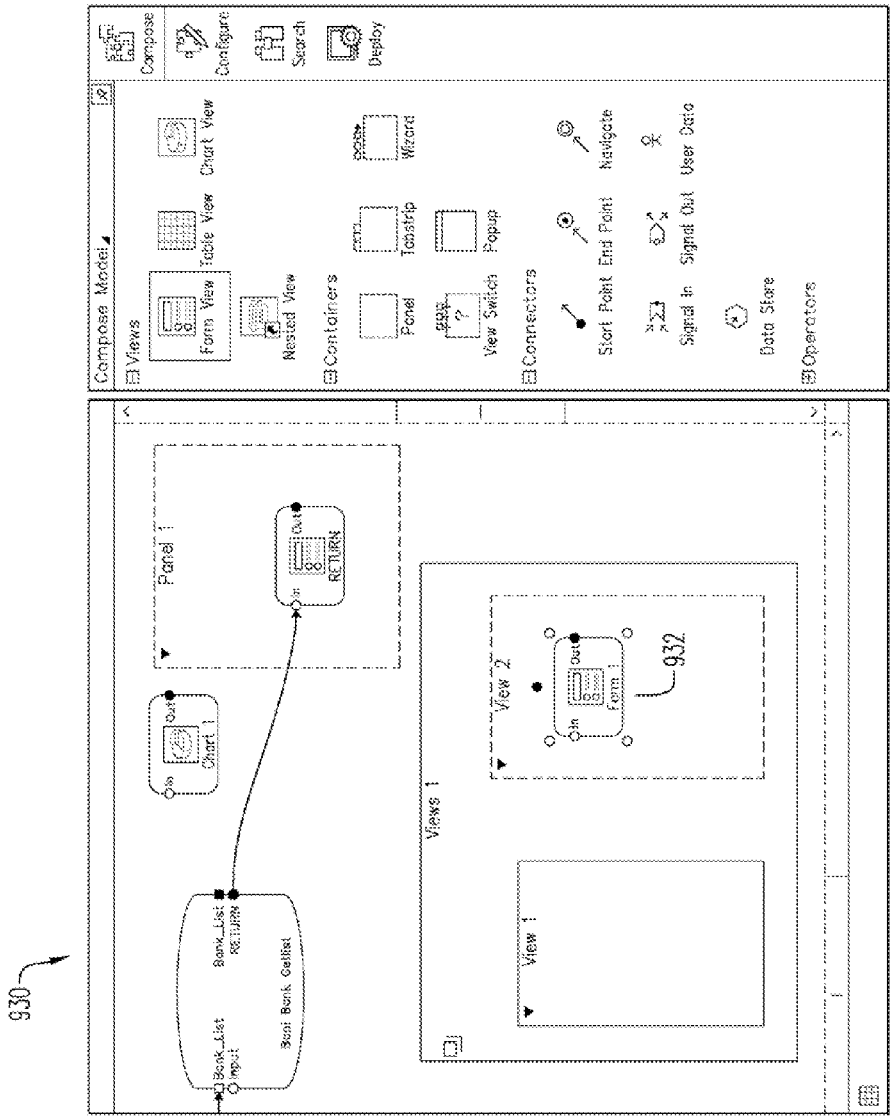

FIGS. 9A through 9C illustrate the use of a design-time rule according to some embodiments. In particular, these figures illustrate the result of using design-time rules to define how modeling language elements behave (e.g., which elements are allowed to be composed within other elements). In this example, FIG. 9A is a display 910 showing a typical designer interaction for adding a new model element 912 labeled "Form View" to a design (e.g., inside another model element). The designer starts the process by dragging the new model element 912 from the palette.

As the new element is being dragged over the display 910, a visual feedback 914 is dynamically provided to indicate whether the dragged element is currently on top of a valid drop target. For example, the visual feedback 914 of FIG. 9A might indicate that the element is not yet over a valid location. In this case, the element might simply be discarded if the designer attempts to place it at the current, invalid location. The visual feedback 922 on the display 920 of FIG. 9B, on the other hand, might indicate that the element is now over a valid drop target (e.g., the area 924 labeled "View2"). Finally, the display 930 of FIG. 9C illustrates that the element 932 labeled "Form1" has been added to the design at that location.

Figure 10:
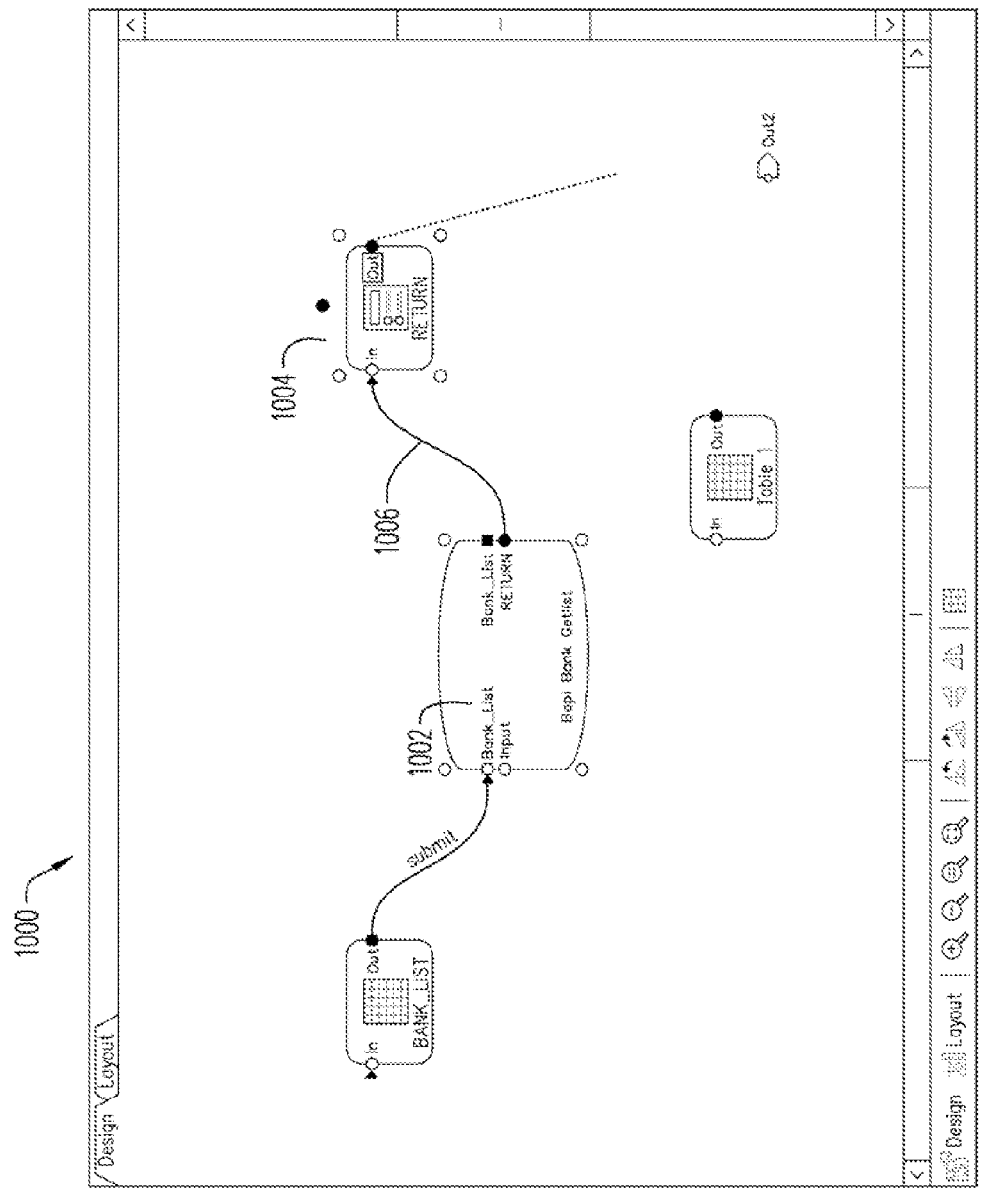
FIG. 10 illustrates the use of a model element connector design-time rule according to some embodiments.

FIG. 10 is a display 1000 that illustrates the use of a model element connector design-time rule according to some embodiments. That is, the display 1000 illustrates the result of using design-time rules to define how a first modeling element 1002 can be connected to a second modeling element 1004 using a designer-defined connector 1006. The designer might, for example, drag a line from a connection point or "plug" on the source element 1002. While the line is being dragged, the valid target plugs to which the line can be connected might be highlighted using animated and/or colored dots. If the designer connects the line to a valid target plug (e.g., on the second element 1004), then a line 1006 connecting the source and target plugs will be created. Otherwise, the operation may be discarded. Note that the operation of the display 1000 may, according to some embodiments, have been previously defined for the designer's particular domain using design-time rules.

The visual feedback provided during interactions such as those described in FIGS. 5 through 10 may help guide a designer and facilitate the creation of valid portal models for a particular domain. This visual feedback may depend, in some cases, on the type of diagram being displayed, the type of elements in context, and other context information, and might be defined dynamically by the corresponding design-time rules. These rules can be evaluated by the visual design tool in a relatively efficient manner, and the visual feedback may be generated in substantially real-time as the designer is dragging the mouse and interacting with the visual design tool.

Figure 11:
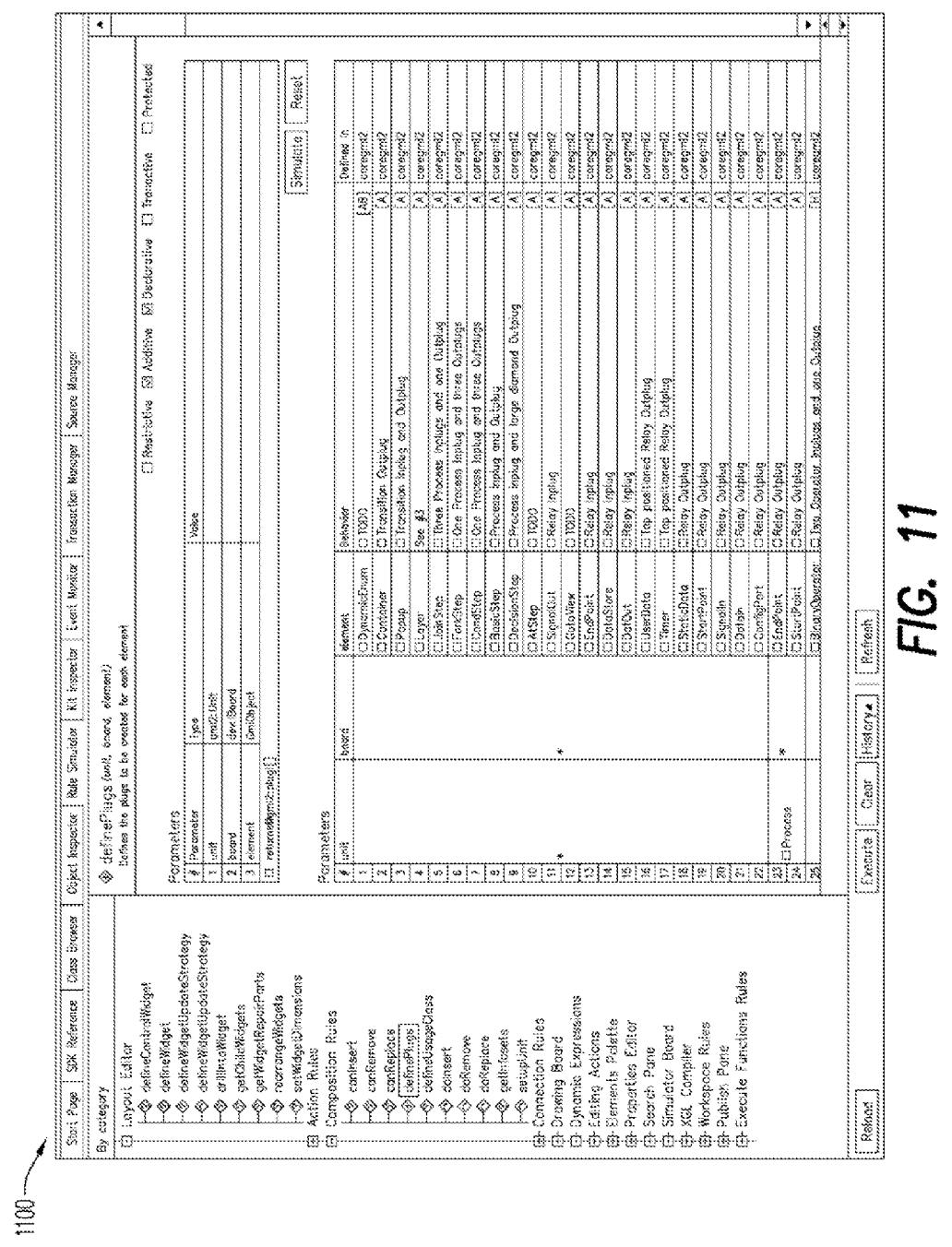

The design-time rules that control operation of the visual design tool may be created and/or modified, for example, using a rule definition wizard and/or a display 1100 such as the one illustrated in FIG. 11. Note that the examples of rules that might be created described herein are just a small subset of the rules that could be used during design-time. For example, an actual commercial modeling tool might use dozens (or even hundreds) of such design-time rules.

According to some embodiments, a list of previously defined design-time rules might be displayed to a system architect. For example, the list might be provided alphabetically, by category, or by the extension kit in which they are defined. The latter illustrates the fact that design-time rules do not need to be hard-coded into a modeling tool, but might instead be provided by separate packages that extend the core modeling tool (i.e., extension kits). This can enable a powerful method for extending and customizing the modeling tools by making them tailored to the requirements of specific application domains and target designers.

The display 1100 illustrates a development tool that might be used to define and simulate design-time rules. In the example of FIG. 11, the display 1100 shows the definition of a concrete design-time rule called "definePlugs" that might be used for defining modeling element connection points or plugs. As can be seen, the defineplugs rule might accept three input parameter: "unit," "board," and "element"—and return a list of plugs to create. This design-time rule might be made of multiple cases, where each case is associated with a specific combination of constraints over input parameters, and may define how the design-time rule should behave when those constraints are satisfied.

Such a display 1100 may also be used to simulate design-time rules. For example, the set of rule cases and their associated constraints may form a decision tree that can be evaluated relatively efficiently at run time to select the rule case or cases that apply for a particular combination of input parameters (context information). In this example, some sample values may be entered for the rule parameters, and the matching rule case might be indicated on the display 1100 accordingly.

The formal definition of rules might be given in XML format. Note, however, that definition might be represented in any other computer-understandable format. The first part of such an XML document might define the concrete rule and its parameters using a <define rule . . . /> clause. This may be followed by a sequence of multiple <extend rule . . . /> clauses, each defining a different rule case with its set of constraints and applicable behavior. While the <extend rule . . . /> clauses may be included together in the same XML document, in practice they might originate from different XML documents that are provided by different extension kits. When the modeling tool is initialized, all the rule definitions from the different extension kits might be loaded and merged, based on a defined ordering relation.

According to some embodiments, actual source code may be generated from the XML definition. The code might comprise JavaScript code or any other programming language as applicable to the target modeling tool. Note that a rule might be compiled into relatively efficient executable code, which can facilitate real-time evaluation of the design-time rules to meet the requirements of highly interactive modeling operations (such as those described in FIGS. 5 through 10).

Note that in some situations, more than one rule case may match a particular set of rule parameters, resulting in a rule conflict. Such rule conflicts might be resolved by different strategies, depending on the rule type (such as by selecting the most-restrictive case, selecting the least-restrictive case, or applying all cases in an additive manner).

According to some embodiments, the details of visual shapes and their attributes may be expressed declaratively using formulas that are bound to the corresponding modeling elements. This may provide a flexible bi-directionally mapping between the modeling language and its visual representation that changes dynamically at run time.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although embodiments have been described as being used to develop a business information portal, embodiments may be used with respect to other types of portals. Moreover, although particular types of modeling and other languages and specifications have been described, embodiments may be associated with any other type of appropriate languages and specifications.

The several embodiments described herein are solely for the purpose of illustration. Persons skilled in the art will recognize from this description other embodiments may be practiced with modifications and alterations limited only by the claims.

What is claimed is:

1. A method associated with a business enterprise portal, comprising:
    identifying a set of design-time functions used in a visual design tool associated with a generic modeling framework;
    creating a set of design-time rules, each rule corresponding to an identified design-time function, wherein at least one of the design-time rules comprises a context-dependent design-time rule associated with a context menu having a dynamic list of available modeling commands that changes depending on a context in which it is displayed;
    defining parameters for each rule in terms of entities of a language of the generic modeling framework;
    defining a set of basic rule cases for each rule to specify rule logic;
    providing a visual design tool plug-in extension mechanism to enable the defined set of basic rule cases to be extended outside the generic modeling framework; and
    automatically interpreting, by a development/build server in substantially real-time, the set of rules and associated basic rule cases, including the context-dependent design-time rule.

2. The method of claim 1, wherein the visual design tool is associated with at least one of: (i) a Visual Composer design tool or (ii) an Eclipse modeling framework.

3. The method of claim 1, wherein a design-time function comprises at least one of: (i) a design-time operation, or (ii) a design-time query.

4. The method of claim 1, wherein the rule logic is associated with at least one of: (i) an input parameter, or (ii) a constraint.

5. The method of claim 1, further comprising:
    adding a design-time rule using a design-time wizard.

6. The method of claim 1, further comprising:
    editing a design-time rule using a design-time wizard.

7. The method of claim 1, wherein said creating is performed via a declarative language.

8. The method of claim 1, wherein at least one created design-time rule comprises a usability rule associated with a model element context.

9. The method of claim 1, wherein at least one created design-time rule is associated with at least one of: (i) a visual appearance of a modeling element, (ii) a modeling element shape, (iii) a modeling element visual attribute, (iv) a modeling element layout, (v) a modeling element mapping to a modeling concept, (vi) a modeling tool palette, (vii) a modeling element behavior, or (viii) a modeling element connection.

10. The method of claim 1, further comprising:
    resolving a rule conflict between a first and second rule case for a design-time rule.

11. The method of claim 1, wherein the created rules are associated with at least one of: (i) a particular application, (ii) a particular type of application, or (iii) an application class.

12. The method of claim 1, further comprising:
    selecting the visual design tool from a set of potential visual design tools.

13. A system, comprising:
    a design-time rule database;
    a rule definition apparatus, coupled to the design-time rule database, to:
        receive from a rule creator an indication of a set of design-time rules, each rule corresponding to an identified design-time function for a visual design tool,
        receive from the rule creator defining parameters for each rule in terms of entities of a language of a generic modeling framework associated with the visual design tool, receive from the rule creator a set of basic rule cases for each rule to specify rule logic, and store, into the rule database, data associated with information received from the rule creator; and a rule implementation apparatus, coupled to the design-time rule database, to:

retrieve, from the design-time rule database, the data stored by the rule definition apparatus, provide an extension mechanism to enable the defined set of basic rule cases to be extended outside the generic modeling framework, and arrange, in accordance with the data retrieved from the design-time rule database, for the set of rules and associated basic rule cases to be interpreted by a generic modeling framework of the visual design tool, wherein at least one design-time rule is associated with a model element context.

14. The system of claim 13, wherein the rule implementation apparatus interfaces with at least one of: (i) a Visual Composer design tool or (ii) an Eclipse modeling framework.

15. The system of claim 13, wherein the rule implementation apparatus interfaces via at least one of: (i) a plug-in to the visual design tool, or (ii) a kit for the visual design tool.

16. The system of claim 13, wherein at least one design-time rule is associated with at least one of: (i) a visual appearance of a modeling element, (ii) a modeling element shape, (iii) a modeling element visual attribute, (iv) a modeling element layout, (v) a modeling element mapping to a modeling concept, (vi) a modeling tool palette, (vii) a modeling element behavior, or (viii) a modeling element connection.

17. A non-transitory computer-readable medium storing processor-executable process steps associated with a business enterprise application, the process steps comprising:

receiving from a rule creator an indication of a set of design-time rules, each rule corresponding to an identified design-time function for a visual design tool;

receiving from the rule creator defining parameters for each rule in terms of entities of a language of a generic modeling framework associated with the visual design tool;

receiving from the rule creator a set of basic rule cases for each rule to specify rule logic;

providing an extension mechanism to enable the defined set of basic rule cases to be extended outside the generic modeling framework; and arranging for the set of rules and associated basic rule cases to be interpreted by a generic modeling framework of the visual design tool, wherein said arranging comprises outputting information associated with an interface tool, and further wherein there are a plurality of interface tools and a single design-time rule may be associated with multiple interface tools.

* * * * *